(No Model.) 2 Sheets—Sheet 1.

J. E. BLACKBURN.
BAKING OR ROASTING PAN.

No. 419,493. Patented Jan. 14, 1890.

WITNESSES:
F. L. Ourand
N. A. Acker

INVENTOR:
Jacob E. Blackburn,
by James Dagger &c.
Attorneys (No Model.) 2 Sheets—Sheet 2.
J. E. BLACKBURN.
BAKING OR ROASTING PAN.
No. 419,493. Patented Jan. 14, 1890.
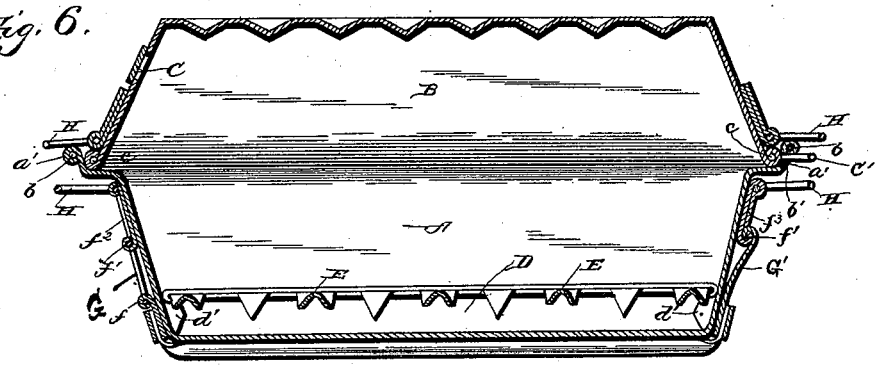
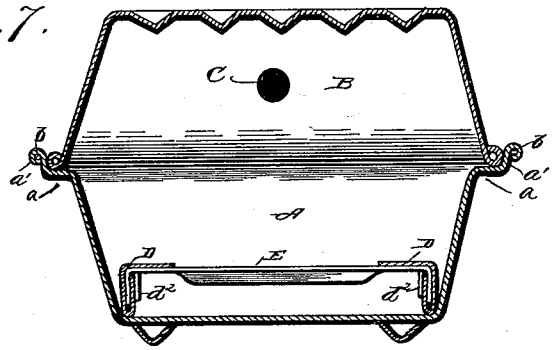
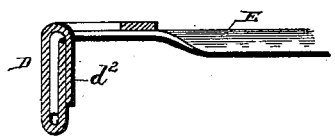
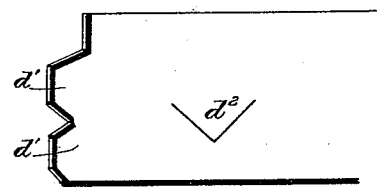
Witnesses:
F. L. Ourand
N. A. Acker
Inventor:
Jacob E. Blackburn,
By his Attorneys,
Baun Bagger & Co

UNITED STATES PATENT OFFICE.

JACOB E. BLACKBURN, OF FREDERICKTOWN, OHIO.

BAKING OR ROASTING PAN.

SPECIFICATION forming part of Letters Patent No. 419,423, dated January 14, 1890.

Application filed August 17, 1889. Serial No. 321,132. (No model.)

*To all whom it may concern:*

Be it known that I, JACOB E. BLACKBURN, a citizen of the United States, and a resident of Fredericktown, in the county of Knox and State of Ohio, have invented certain new and useful Improvements in Baking or Roasting Pans; and I do hereby declare that the following is a full, clear, and exact description of the invention, which will enable others skilled in the art to which it appertains to make and use the same.

This invention has relation to certain new and useful improvements in baking or roasting pans; and it consists of the details of construction and arrangement of parts, as will be hereinafter more fully shown in the accompanying drawings and described in the specification.

The general object of my invention consists in so providing and constructing a roasting pan or receptacle that the articles placed therein for cooking will be prevented from coming into direct contact with the current of heated air, and which at the same time provides against the cooking-vessel coming against the walls of the heating-oven.

My invention further consists in providing means whereby the sections of the vessels may be so connected as to allow the inspection of the contents therein without causing the removal of the pans from the oven proper and without causing the complete detachment of the parts; and my invention further consists in means whereby the retained steam may be permitted to escape from the vessel when desired, that the articles to be cooked may be more thoroughly browned without the danger of injury to the hands, and also means whereby the bottom grate may be removably secured to the lower section of the baker.

Figure 1:
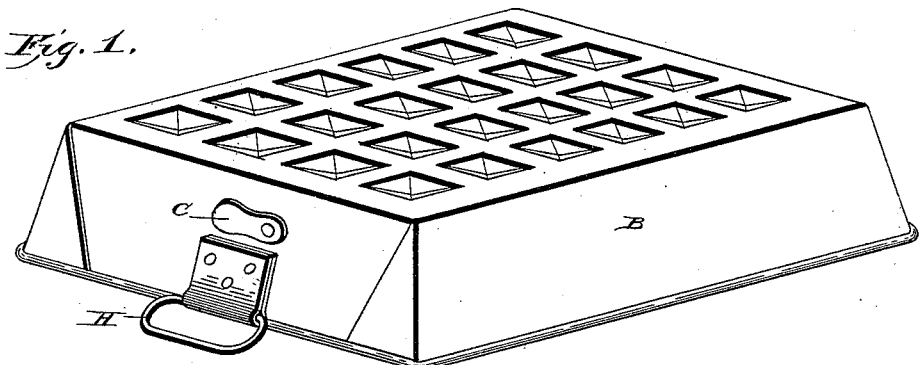
Figure 2:
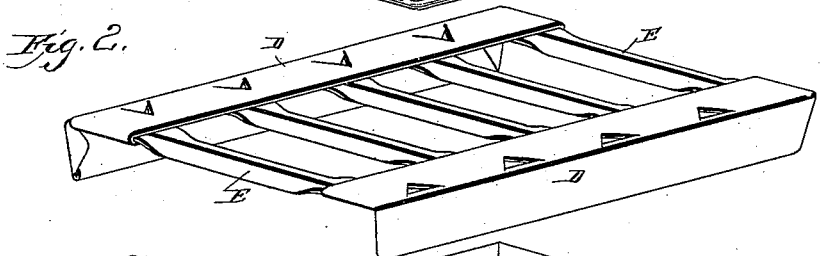
Figure 3:
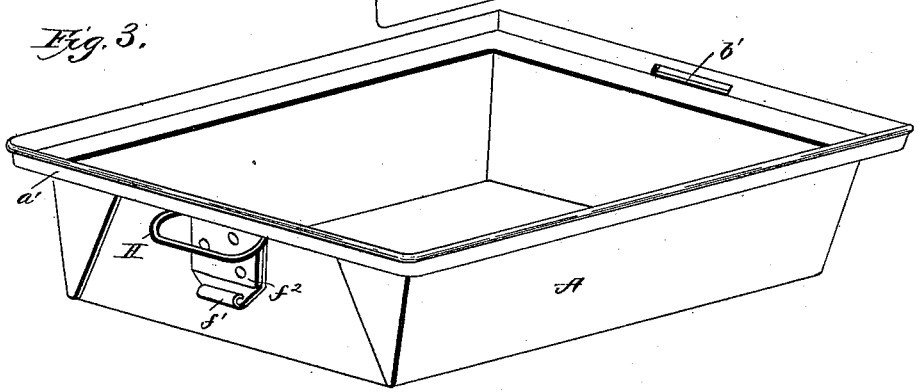
Figure 5:
Figure 4:
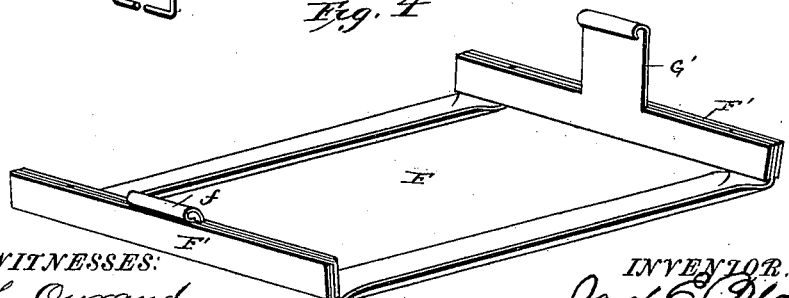

Referring to the drawings forming a part of this specification, Figure 1 is a perspective view of the upper section of the roaster. Fig. 2 is a similar view of the inner grate. Fig. 3 is a similar view of the lower section of the roaster. Fig. 4 is a similar view of the removable bottom grate. Fig. 5 is a detail view of the staple. Fig. 6 is a longitudinal vertical sectional view. Fig. 7 is a cross-sectional view. Fig. 8 is an end enlarged view, partly in section, of the inner grate; and Fig. 9 is a detail view of the blank from which the side pieces are formed, illustrating the same before being bent or creased.

Similar letters of reference are used to denote corresponding parts throughout the entire specification and several views of the drawings.

In the drawings, the letter A is used to represent the lower section or pan of my improved roaster, which is provided with the outwardly inclined or flared sides and ends. The top or upper edge of said inclined walls is formed with the outward and upper flange $a$ $a'$. The flange $a'$ has its top outwardly turned or doubled, and between said turned-over portion is inclosed the wire $b$. One end of the upper flange $a'$ has formed therein the slot or opening $b'$.

The upper section of the roaster is indicated by the letter B and is in shape made to correspond with the lower section. The lower edge thereof is also outwardly turned, similar to the upper flange of the lower section, and has incased between such turned-over portion the wire $c$, which wire projects at one end, so as to form the hook or keeper $c'$, which keeper, when the two sections are brought together, passes through the slot or opening $b'$, so as to hold the two in position. The flanged top of the lower section serves as a bearing, upon which rests the lower turned wire bottom of the upper section. By thus forming the two sections with re-enforced edges I not only form a more secure hold for the hand when cleaning the same, but also add greatly to the strength of the same. It is of great importance that the surrounding or re-enforcing wire be secured (by turning over of the metal) from the outside. By experiments I have discovered that if the wiring be from the inside there is a great tendency for the grease or fat or particles of cooked meat to lodge between the surrounding edges of the turned-over portion of the sections, and which, being nearly impossible to extract, become rancid or decomposed and greatly affects the article being cooked within the vessel. However, by wiring from the outside this defect is overcome, inasmuch as whatever matter may be secluded between the edges can be easily removed, and if removed will fall to the outside and not affect the contents of the vessel. The top of the upper section I provide with a series of square depressions, which of necessity causes a corresponding series of projections on the inner side of the section. If so desired, the top may be corrugated. By thus constructing the top of the upper section the steam generated from the articles being baked contained between the sections will, after becoming condensed, be caused to fall upon the meats, thus forming a perfect "baster." In order to provide for the escape of retained steam when it is desired to accomplish the browning of the cooked article, I provide a damper or vent C at one end of the upper section, which overcomes the necessity of removing one section from the other in order to permit its escape. In devices where this latter expedient is necessary the steam escapes very rapidly, and, besides, the operator is quite liable to be burned in separating the sections. By the use of the damper, however, this liability is not prevalent.

The inner grate consists of the side bars or pieces D and the intermediate or supporting cross-pieces E, said longitudinal and cross pieces being connected together without the use of rivets or bolts in the following manner:

The side pieces D consist each of a blank creased or folded to a point slightly below its center and are turned or bent at right angles. When thus turned into the position just described, the angular ends of the cross-pieces are inserted between the creased or folded portion of the side pieces, as clearly shown in the drawings. It will also be noticed that the extremities of the side pieces are notched, so as to form tongues $d'$ $d'$, which are bent over, thus constituting secure end fastenings. Before the side pieces D D are bent in the manner described angular slots are stamped therein, which serve to form tongues $d^2$, said tongues, when the cross-pieces are properly adjusted, being bent down upon the creased or folded portion, thus serving to hold the same securely in place against the angular extension of the cross-pieces secured between the folds of the side pieces.

In order that the bottom of the lower section may not at all times be in direct contact with the bottom of the oven and to allow for a uniform circulation of heat around the vessel, I provide the removable bottom grate F, which consists of the V-shaped longitudinal side pieces and end pieces F', said side pieces being riveted to the end ones. The upper end of the end pieces have formed thereon the end loops $f$, which correspond with the end loops $f'$, formed on the handle-plates $f^2$. One end of the grate is secured to the section A by means of the staple G, which fits in the loops $f$ and $f'$, while the other end is secured through the medium of the extended looped end G'. The upper or hook end of the extension G' likewise engages the end loops $f'$ of the opposite handle $f^2$, thus dispensing with the employment of a staple at this end of the roaster. By thus constructing the bottom grate so as to be removably connected to the lower section I provide for the cooking or baking of bread and the like, which requires a slow bake. Both the upper and lower sections are provided with the ordinary handles H H.

Having thus fully described my invention, what I claim as new, and desire to secure protection in by Letters Patent of the United States, is—

1. The combination, with a roasting and baking pan, of an inner removable grate, said grate consisting of the side pieces composed each of a blank creased or folded to a point slightly below its center and turned and bent at right angles and provided with a series of end tongues and longitudinally-arranged tongues, and of cross-pieces provided with angular ends adapted to pass into the pockets formed by the lower or folded portions of the side pieces, substantially as set forth.

2. The combination, with the upper and lower sections, of the removable grate, said grate consisting of the side and end pieces secured together, one end being provided with a hook or loop and the opposite end with an upward extension terminating in a hook engaging the end loop of the handle of the lower section, handle-plates secured to the ends of the lower section, said plates provided with lower hooked or looped ends, and a staple engaging the hook upon one end of the bottom grate and the hooked or looped end of the handle-plate, substantially as set forth.

In testimony that I claim the foregoing as my own I have hereunto affixed my signature in presence of two witnesses.

JACOB E. BLACKBURN.

Witnesses:
JAS. M. BLAIR,
OKY WYKER.